Sept. 17, 1963   H. E. EIRHART, JR   3,104,095
MOTOR VEHICLE WHEEL SUSPENSION
Filed July 1, 1960
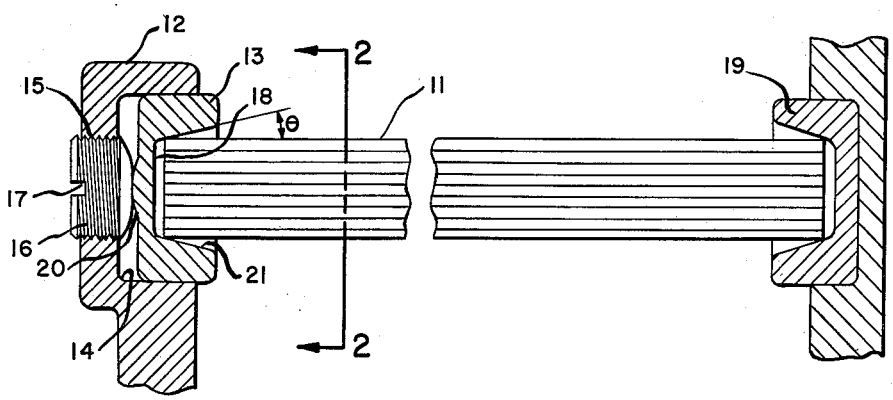
FIG. 1
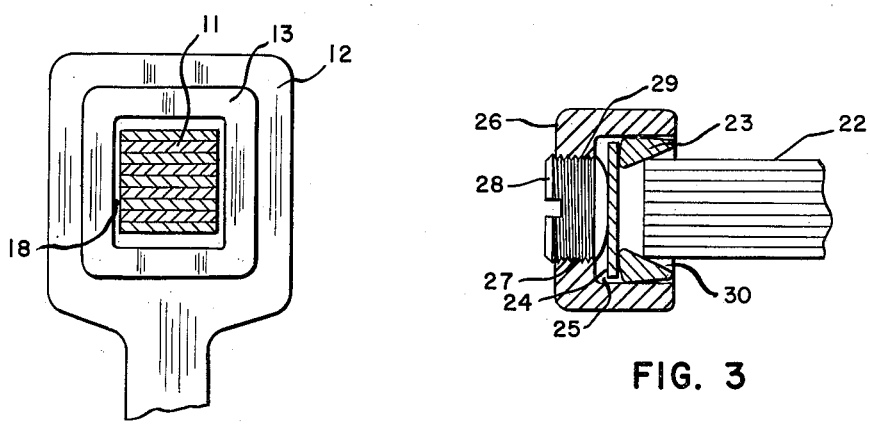
FIG. 2
FIG. 3
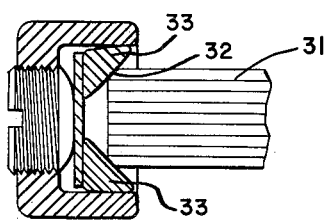
FIG. 4
HARRY E. EIRHART, JR.
*INVENTOR.*
BY John R. Faulkner
Thomas H. Oster
ATTORNEYS United States Patent Office 3,104,095
Patented Sept. 17, 1963

3,104,095
MOTOR VEHICLE WHEEL SUSPENSION
Harry E. Eirhart, Jr., Detroit, Mich., assignor to Ford Motor Company, Dearborn, Mich., a corporation of Delaware
Filed July 1, 1960, Ser. No. 40,310
7 Claims. (Cl. 267—57)

This invention relates to a motor vehicle wheel suspension and more particularly to an anchoring means for a load supporting torsion spring of a suspension system. Devices currently utilized to anchor laminated leaf torsion springs to the chassis of motor vehicles act on the surface of the outer leaves, which results in a portion of the spring being restrained in its spring action.

The anchoring means of the present invention comprise wedge shaped members which are forced into engagement with the edges of the outer leaves of a laminated leaf torsion spring by an adjusting means.

The object of this invention is to provide a means for anchoring a laminated torsion leaf spring whereby dead spring length is eliminated.

Another object is the reduction of the stress concentration on the outer leaves which is present in currently utilized anchoring devices, since a shear action due to overlapping engagement of the flat anchoring devices at the leaf end portion of the spring is eliminated. The wedge shaped members of the present construction act on the outer leaves which results in the compression of every leaf, rendering every leaf of a laminated leaf torsion spring active under load.

A further object of this invention is to provide an adjustable means for the wedge shaped anchoring means to allow for the compensation of tolerance variations of the individual spring leaves and for dimensional tolerance accumulation of the entire torsion leaf spring. Also, variations and differences between the sprung and unsprung portions of a motor vehicle can be compensated for by the adjustable anchoring means of the present invention.

Other objects and advantages of this invention will become more apparent as this description proceeds, particularly when considered in connection with the accompanying drawings wherein:

FIGURE 1 is a side elevational view of a portion of a torsion leaf spring suspension system constructed in accordance with the present invention.

FIGURE 2 is a sectional view taken at line 2—2 of FIGURE 1.

FIGURE 3 is a partial side elevational view of another embodiment of this invention, showing a different construction of the torsion spring anchoring means, and FIGURE 4 is a partial side elevational view of a further modification of the torsion spring anchoring means.

It is to be understood that the anchoring means of this invention, which anchors one end of a torsion leaf spring in a housing, may be associated with either the unsprung portion or the sprung portion of a motor vehicle comprising either a frame or unitary body and frame construction. In the following description, for illustrative purposes only, the anchoring means is mounted on a housing which is either pivotally attached to or is an integral part of the unsprung portion of a motor vehicle.

In FIGURE 1 is seen a laminated torsion leaf spring 11 which is anchored to a housing 12. One end of the laminated torsion leaf spring 11 is received in an opening in an anchor member 13 which is mounted in a recess 14 in the housing 12. The recess 14 is rectangular in shape when viewed in side elevation as seen in FIGURE 2, but may be of any suitable configuration to non-rotatably hold the anchor member 13 in the housing 12.

A bore 15 in the housing 12 connects with the recess 14. The internal diameter of the bore 15 is threaded to receive an externally threaded plug 16. The plug 16 has a slot 17 which permits the adjustment of the plug 16 with a screwdriver in the threaded bore 15 of the housing 12. The plug 16 may also be designed to be rotated by any of the special wrenches known in the art.

The external configuration of the anchor member 13 is similar to the rectangular shape of the recess 14 to prevent the rotation of the anchor member 13 in relationship to the housing 12. The anchor member 13 has a counterbored portion 18 with two sides of the counterbore sloping inwardly, forming an angle with the horizontal plane as seen in FIGURE 1. The other two sides of the counterbore may be straight and parallel. One end of the laminated leaf torsion spring 11 is received in the counterbored portion 18 of the anchor member 13 while the other end of the torsion spring 11 is held in a retainer 19 connected to the spring portion of the motor vehicle.

The anchor member 13 has a spherical bearing surface 20 on the end opposite the counterbored portion 18 to engage the plug 16. To adjust the anchor member 13, the plug 16 is rotated into the housing 12 until it engages a spherical bearing surface 20 of the anchor member 13 which in turn forces inclined surfaces 21 of the anchor member 13 against the edges of the outer leaves of one end of the laminated leaf torsion spring 11.

In FIGURE 3 is seen another embodiment of this invention in which a laminated leaf torsion spring 22 is anchored by two wedge shaped members 23 and a pressure plate such as a washer 24 received in a recess 25 of a housing 26. A cylindrical bore 27 in the housing 26 connects with the recess 25. The bore 27 is internally threaded to receive an external threaded plug 28. The recess 25 in the housing 26 has a generally rectangularly shaped opening which is larger in dimension than the bore 27. The washer 24 is placed into the recess 25 until it seats itself on an internal shoulder 29 of the housing 26. The two wedge shaped members 23, which act as spring securing members, are placed on opposite sides of the rectangular recess 25. The plug 28 is rotated in the bore 27 to engage the washer 24 which in turn forces the inclined surfaces 30 of the wedge shaped members 23 against the edges of the outer leaves of one end of the laminated leaf torsion spring 22. The surfaces of the wedge shaped members 23 may be radially crowned, as seen in FIGURE 3, to assure optimum contact between the edges of the outer leaves of the laminated leaf torsion spring 22 and the wedge shaped members 23.

In FIGURE 4 is seen another embodiment of this invention in which the edges of the outer leaves of one end of a laminated leaf torsion spring 31 are slightly chamfered at a predetermined angle which is to be less than the angle formed by the inclined surfaces and the horizontal plane. The chamfered edge 32 will increase the bearing surface between wedge shaped anchoring members 33 and the torsion leaf spring 31, thereby lowering the stress on the outer leaves without materially increasing the inactive length of the torsion leaf spring 31. Also, the construction shown in this embodiment will considerably increase the contact area between the torsion leaf spring 31 and the wedge shaped member 33 as torque is applied to the torsion leaf spring 30.

Referring now to FIGURE 1, it can be seen that the inclined surfaces 21 of the anchor member 13 will compress every leaf of the spring due to the engagement of the inclined surfaces 21 with the edges of the ends of the outer leaves of the laminated leaf torsion spring 11. The compressive forces on the edges distribute the loading to every leaf of the torsion leaf spring 11 which, consequently, makes every leaf active under load. Also, the wedge shaped anchoring means will eliminate all end play of the leaves of the torsion leaf spring 11 when under normal load conditions.

In FIGURE 3, the anchor member comprises two wedge shaped members 23 which are forced into engagement with the outer edges of the laminated leaf torsion spring 22 by the washer 24 which in turn is being engaged by an adjustable means comprising a threaded plug 28. The construction of the anchoring means shown in this embodiment results in the self-alignment of the wedge shaped members 23 upon their engagement with the edges of the outer leaves of the torsion leaf spring 22 to bring about optimum retention of the torsion spring member.

It will be understood that the invention is not to be limited to the exact construction shown and described but that various changes and modifications may be made without departing from the spirit and scope of the invention as defined in the appended claims.

I claim:

1. In a motor vehicle suspension, in combination, a laminated leaf torsion spring, a housing having an opening therein, an anchor member having a recess with at least one side of the recess being inclined, said anchor member being nonrotatably received in the opening in said housing, one end of said laminated leaf torsion spring being nonrotatably received in the recess of said anchor member, and adjustable means for positioning said anchor member in said housing with at least one inclined side of the recess in engagement with an edge of an outer leaf at one end of said laminated leaf torsion spring.

2. The structure as defined in claim 1 which is further characterized in that one end of the opening in said housing has a threaded portion, and said adjustable means comprises an externally threaded plug received in said threaded portion.

3. In a motor vehicle suspension, in combination, a laminated leaf torsion spring, a housing having a counterbore and an opening, a plurality of spring securing members, an adjustable means, a pressure plate, said pressure plate engageable with said adjustable means, said counterbore in said housing receiving said spring securing members, said pressure plate, and one end of said torsion spring, each spring securing member having at least one inclined surface, said adjustable means being positionable in said opening in said housing to force at least one of said inclined surfaces of said spring securing members into engagement with an edge of the outer leaf at one end of said laminated leaf torsion spring to nonrotatably hold one end of said torsion spring in said housing.

4. In a motor vehicle suspension, in combination, a laminated leaf torsion spring, a housing having a counterbore and an opening, a pair of spring securing members, an adjustable means, a pressure plate, said pressure plate engageable with said adjustable means, said counterbore in said housing receiving said spring securing members, said pressure plate, and one end of said torsion spring, at least one of said spring securing members being a wedge shaped member, said wedge shaped member having at least one of its surfaces radially crowned, said adjustable means being positionable in said opening in said housing to force the radially crowned surface of one wedge shaped member into engagement with one edge of the outer leaves at one end of said laminated leaf torsion spring to nonrotatably hold said respective one end of said torsion spring in said housing.

5. In a motor vehicle suspension, in combination, a laminated leaf torsion spring, a housing having a counterbore and an opening, a pair of spring securing members, an adjustable means, a pressure plate, said pressure plate engageable with said adjustable means, said counterbore in said housing receiving said pressure plate, one end of said torsion spring and said pair of spring securing members positioned on opposite sides of said one end of the torsion spring, each spring securing member having one radially crowned inclined surface, said adjustable means being positionable in said opening in said housing to force the inclined surface of each of said pair of spring securing members into engagement with a respective edge of the outer leaf at one end of said laminated leaf torsion spring to nonrotatably hold said respective one end of the latter in said housing.

6. In a motor vehicle suspension, in combination, a laminated leaf torsion spring having two outer leaves with the terminal end of each outer leaf defining an edge, an anchor member having a recess, at least two sides of the recess being inclined, said anchor member being nonrotatably received in the opening in said housing, one end of said laminated leaf torsion spring being nonrotatably received in the recess of said anchor member, adjustable means for positioning said anchor member in said housing with the inclined sides of the recess in engagement with said edges of the two outer leaves at one end of said laminated leaf torsion spring.

7. In a motor vehicle suspension, in combination, a laminated leaf torsion spring having two outer leaves with the terminal end of each outer leaf defining an edge, a housing having a counterbore and an opening therein, a plurality of spring securing members, each spring securing member having an inclined surface, an adjustable means, a pressure plate, said pressure plate engaging said adjustable means, said counterbore in said housing receiving said pressure plate, one end of said torsion spring, and at least one of said spring securing members on each side adjacent the outer leaves of said torsion spring, said adjustable means being positionable in said opening in said housing to force the inclined surface of each of said spring securing members into engagement with the respective edge of the outer leaf at one end of said laminated leaf torsion spring to nonrotatably hold the respective one end of the latter in said housing.

References Cited in the file of this patent

UNITED STATES PATENTS

| | | |
|---|---|---|
| 1,279,268 | Coldwell | Sept. 17, 1918 |
| 2,606,020 | Anderson | Aug. 5, 1952 |

FOREIGN PATENTS

| | | |
|---|---|---|
| 801,669 | Germany | Jan. 18, 1951 |
| 1,031,148 | Germany | May 29, 1958 |